Patented Mar. 16, 1926.

1,577,389

UNITED STATES PATENT OFFICE.

KAREL URBAN, OF PECKY, CZECHOSLOVAKIA, ASSIGNOR TO SELIGMAN ELBOGEN, OF PRAGUE-N, CZECHOSLOVAKIA, A FIRM.

PURIFICATION OF SUGAR SOLUTIONS.

No Drawing.   Application filed June 2, 1924.   Serial No. 717,433.

*To all whom it may concern:*

Be it known that I, KAREL URBAN, citizen of Czechoslovakia, residing at Pecky, Czechoslovakia, have invented certain new and useful Improvements in the Purification of Sugar Solutions, of which the following is a specification.

It has already been suggested by Harm to use for the purification of sugar solutions ferruginous clay (bole) and porphyry-tuff, and by Rumpler to use zeolites and the like products obtained from cement-kieselguhr and ochre in order to eliminate alkalies from sugar solutions and to replace them by lime salts.

Ganz has suggested for the elimination of alkalies from molasses the use of a product obtained by fusing alumina-silicates with alkali earth metal silicates or alkali earth metal carbonates with the addition of quartz.

From the experiment of Dr. H. Claassen it has been found that the removal of alkalies from molasses can be effected only partially by such silicates and that an equivalent quantity of lime salts passes into the solution in place of the alkalies removed; further that the increase of purity assumed by the above authors is relatively small and mostly corresponds with the exchange of alkalies for lime of which the equivalent quantity weighs less.

Dr. Claassen found that another action than the perceived exchange of alkalies for lime with silicates cannot be determined, particularly that the quantity of organic non-sugars is not varied by this purification, further that the syrups purified in this manner contain a large amount of lime salts which cause a considerable increase in the viscosity and lead to a difficult boiling of the syrup by reason of the strong foaming thereof.

The reason of the failure of all these processes is the circumstance that the alkali salts of the sugar solutions have been replaced by lime salts, thereby rendering the boiling and extraction of sugar more difficult. In addition, the purification obtained by these processes is comparatively slight.

According to the present invention a considerable purification of sugar solutions is effected by filtering them through natural (zeolites) or artificial compounds which have the property of exchanging alkaline earths for the alkalies of the sugar solution. This filtration is continued until a maximum enriching of these sugar solutions with the salts of alkaline earths has been obtained whereupon the sugar solutions, enriched in this manner are then further filtered through sufficient quantities of the above mentioned compounds to separate from the sugar solution most of the alkaline earth salts.

In addition a large portion of the ash substances and also organic non-sugars are retained by the said compounds. It has been found that the purification becomes the more intense, the more concentrated the sugar solutions which ore filtered.

It may here be explained that if a sugar solution containing the alkali salts (K, Na) is filtered through natural or artificial compounds, having the property of exchanging alkaline earths (Ca, Mg, Sr, Ba) for the alkalies (K, Na) contained in the solution, there is first an exchange of the alkaline earths for the alkalies.

The alkalies are retained in the filter mass and in their stead the alkaline earths pass into the solution. The solution then contains after filtration Ca or Mg or Sr or Ba salts. If for example the solution containing Ca salts is filtered through natural (zeolites) or artificial compounds, which have the property of exchanging alkaline earths for the alkalies of the sugar solution an adsorption of the dissolved salts takes place.

In this example the Ca salts contained in the solution are retained by the filtration material.

In addition to the Ca salts there are also adsorbed from the sugar solutions ashy substances and a part of the organic non-sugar substances.

For example diluted molasses of about 60° Bg and the following composition:—

Purity quotient Pq=62.2.
Ratio of CaO to 100 times refraction=

$$\frac{CaO}{100\ R} = 0.54\%$$

Ratio of ash to 100 times polarization =

$$\frac{A}{100\,P} = 18.89\%$$

Ratio of colour to 100 times polarization =

$$\frac{C}{100\,P} = 579°\,St.$$

had after maximum enriching by lime salts the following composition:—

$$PQ = 65.4;\ \frac{CaO}{100\,R} = 466\%;\ \frac{A}{100\,P} = 15.88;\ \frac{C}{100\,P} = 656°\,St.$$

By further filtration a syrup of the following composition results:

$$PQ = 88.6;\ \frac{CaO}{100\,R} = 0.37;\ \frac{A}{100\,P} = 4.45;\ \frac{C}{100\,P} = 102°\,St.$$

Therefore a syrup is obtained from the molasses of which the purity in comparison with the original molasses has been increased by 26.4°, the ash content reduced by 76.4% and the colour reduced by 82%.

It has been further ascertained that syrup previously purified by silicate filitration can be still further purified by addition of lime and instantaneous carbonatation as stated in German patent specification No. 389810. By the latter a considerable portion of colouring matters is removed and the content of ash and other organic substances is still further reduced. Thus for example a syrup obtained by the above mentioned filtration of the molasses was saturated by the addition of 15% of lime. The original composition of this syrup was the following:—

$$PQ = 83;\ \frac{A}{100\,P} = 5.71\%;\ \frac{F}{100\,P} = 151°\,St.$$

After saturation with lime it is:—

$$PQ = 90;\ \frac{A}{100\,P} = 2.53\%;\ \frac{F}{100\,P} = 16°\,St.$$

In this case therefore the purity is increased altogether by 28°, the ash content is reduced by 86%, and the colour by 97%.

Besides the known silicates that have the property of exchanging alkaline earths for the alkalies of the solutions, it is also possible to use other artificial products having the same properties for the purification of sugar solutions. It has been found that for this purpose particularly suitable are the dried precipitates obtained by decomposition of the dilute solutions of the salts of aluminium, iron or alkaline earths by a waterglass solution. The aluminium, iron or alkaline earth salts can be decomposed by the waterglass solution either separately or in mixtures. The dried precipitates, after careful washing, are converted for example into the lime compounds by the action of a calcium chloride solution.

For example to a boiling about 8% solution of sulphate of iron, a quantity of about 1:10 diluted waterglass solution is added until slight alkalinity is observed. The precipitate is filtered off, dried, washed with water and then treated with a diluted calcium chloride solution. After washing, this granular material is ready for the filtration of the sugar solution.

In the case of dry precipitates the conversion of the magnesium compound is produced by the action of a solution of magnesium salt for example $MgCl_2$. The conversion into strontium or barium compound is effected by the action of the strontium salt solution, (for example $Sr.\,Cl_2$) or barium salt solution (for example $BaCl_2$) on the said dry precipitate.

What I claim and desire to secure by Letters Patent is:—

1. Process of purifying a sugar solution by means of a compound which has the property of exchanging alkaline earths for the alkalies of the sugar solution, characterized by the fact that the sugar solution is filtered through said compound until a maximum enriching of the sugar solution with alkaline earths is obtained and is then further filtered through a compound having said exchange property to remove alkaline earths and other ashy substances and organic non-sugar substances to a large extent from the solution.

2. Process for the purification of sugar solutions according to claim 1, characterized by the fact that for the filtration of the sugar solution dried precipitates are used which have been prepared by the decomposition of a dilute solution of a suitable salt by a dilute waterglass solution, the washing of the precipitate, its treatment with salts of alkaline earths and final drying.

In testimony whereof I have signed my name to this specification.

KAREL URBAN.